United States Patent [19]

Tamori

[11] Patent Number: 5,400,662
[45] Date of Patent: Mar. 28, 1995

[54] MATRIX TYPE SURFACE PRESSURE DISTRIBUTION DETECTING ELEMENT

[75] Inventor: Teruhiko Tamori, Iruma, Japan

[73] Assignee: Enix Corporation, Japan

[21] Appl. No.: 25,279

[22] Filed: Mar. 2, 1993

Related U.S. Application Data

[63] Continuation-in-part of Ser. No. 15,392, Feb. 9, 1993.

[30] Foreign Application Priority Data

Apr. 17, 1992 [JP] Japan .................................. 4-124285

[51] Int. Cl.⁶ ............................................... G06K 9/00
[52] U.S. Cl. ..................................... 73/862.046; 382/4
[58] Field of Search ................. 73/105, 862.046, 865.7; 382/4, 5; 356/71

[56] References Cited

U.S. PATENT DOCUMENTS 3,781,855 12/1973 Killen ........................................ 382/4
4,429,413 1/1984 Edwards .................................... 382/4
4,577,345 3/1986 Abramov ................................... 382/4

Primary Examiner—Richard E. Chilcot, Jr.
Assistant Examiner—R. Biegel
Attorney, Agent, or Firm—Laff, Whitesel, Conte & Saret, Ltd.

[57] ABSTRACT

A surface pressure distribution matrix of detecting elements requires no positioning operation during a manufacturing process and does not vary in sensitivity depending on where surface pressure is applied to the matrix. A large number of transistors in a matrix form are formed on a single semiconductor substrate. A flexible film having a conductive coating is formed over the matrix of detecting elements. The collector electrodes of a plurality of transistors are commonly connected to each other to form rows in the matrix, each row being electrically isolated from the other rows. The base electrodes of the plurality of transistors are commonly connected to each other to form columns in the matrix, each column being electrically isolated from the other columns. When the flexible film receives a surface pressure from the ridges of a fingerprint, the depressed portions of the conductive coating on the film are brought into contact with the matrix of detecting elements. As a result, the transistors in the matrix turn on in the pattern of the fingerprint ridges. Shift registers scan the on/off states in the matrix of transistors to detect the fingerprint pattern. One embodiment uses bipolar transistors. Another embodiment uses MOS field effect transistors.

11 Claims, 6 Drawing Sheets

MATRIX TYPE SURFACE PRESSURE DISTRIBUTION DETECTING ELEMENT

This is a continuation-in-part of Ser. No. 08/015,392, filed Feb. 9, 1993.

The invention relates to a semiconductor matrix type surface pressure detecting element and more particularly to means for reading small-surface pressure distributions, such as result from the ridges and valleys of a fingerprint pattern.

BACKGROUND OF THE INVENTION

For convenience of expression, following specification and claims use the terms "row, column, horizontal, vertical, and matrix" to describe an orthogonal array. These terms do not necessarily identify any particular orientation other than the orthogonal relationship. Also, the invention is described below in terms of MOS field effect transistors. However, it should be understood that other types of transistors may also be used. Therefore, in the following specification and claims, the references to MOS field effect transistors should be construed to mean any suitable transistor.

A fingertip is an example of a device for applying a very small-surface pressure distribution in a fixed pattern. In a conventional fingerprint pattern detecting apparatus, a fingertip is brought into contact with one surface of a prism which is irradiated with light. The light is reflected with reverberation from the prism surface and is received by a photo-detector element, such as a CCD (charged couple device). The fingerprint pattern is detected in accordance with an output signal from the photo-detector element.

However, this method is susceptible to adverse influences, such as those resulting from sweat and moisture, to an extent that a fingerprint pattern cannot be accurately detected and read. The sweat of the person who had his fingerprint last measured may still be on the surface of the prism to cause measurement errors, resulting in false readings and inconvenience to the person whose fingerprints are being read.

In greater detail, the residue may absorb light irradiated from outside for measurement of a finger print. Because of the residue, there is little reflection of the light from the surface of the prism, resulting in failure of measurement of the finger print. There may also be many other causes of false readings. A failure of the measurement of a finger print may not only be due to the residue from the sweat of a person who previously measured his finger print, but also may be a result of moisture from anywhere, such as ambient humidity, rain, or the like. Dryness may also cause false readings due to a failure of the measurement to correctly detect a total reflection of the light from the surface of the prism. Therefore, a finger print pattern cannot always be accurately detected by a light reading method.

In addition, this prior art method requires a high power consumption and, therefore, is not suitable for battery powered readers. Thus, the described prior art fingerprint readers are not suitable for outdoor measurements, as by police who are working in the field.

In Japanese Patent Laid-Open No. 63-204374, the present inventor disclosed a detecting apparatus for reading a fingerprint responsive to the differentials of pressure or contact resulting in a surface pressure distribution detecting apparatus which was free from the above-mentioned problems of light reflection. According to this disclosure, the pattern is found from a change in conductivity caused by a pressure difference applied by the tops ("ridges") and bottoms ("valleys") of a skin surface forming a fingerprint. The detector responds to the pressure differences on a sheet of conductive rubber having a conductivity which is changed in accordance with the pressure. A scanning electrode matrix responded to the conductivity changes by giving signals in an on/off or digital manner.

The present inventor next described a surface pressure distribution detecting element in Japanese Patent Application No. 2-179735 and U.S. Pat. No. 5,079,947. In this element, scanning electrodes extend in one direction on a hard substrate. The electrodes are spaced apart from each other at a predetermined pitch (50 to 100 μm). Resistance films are formed over the scanning electrodes. Stacked on the resistance films is a flexible film having a lower surface with scanning electrodes extends in perpendicular directions. The total resistance of the resistance films between the scanning electrodes is changed in accordance with the areas of the ridges of the fingerprint skin surface brought into contact with the resistance films, via the flexible film.

The inventor's prior surface pressure distribution detecting elements are free from the adverse influences of sweat and moisture. However, these elements face problems relating to material, structure, and manufacturing. It is difficult to find a practical and durable flexible film material which can accurately transmit the pressure distribution of the skin surface and can assure a deposition of the scanning electrodes, as by etching or the like. During the manufacturing process, it is also very difficult to position the scanning electrodes in rows and columns extending perpendicular to each other. Also, the pressure sensitivity of the element may vary depending on the lack of uniformity of quality.

SUMMARY OF THE INVENTION

In keeping with an aspect of the invention, a large number of transistors, arranged in a matrix form, are manufactured on a single semiconductor substrate. The collector electrodes of a plurality of transistors are commonly connected in columns. The transistors in a column are commonly connected to each other, but are electrically separated from transistors in other columns. The base electrodes of a plurality of transistors are commonly connected to each other, row by row, with electrical separation between the rows of transistors. The rows are arranged perpendicular to the columns in order to form an orthogonal matrix.

The plurality of semiconductor switching elements are arranged in a matrix form, at a pitch of 10 to 100 μm on a semiconductor substrate. Each of these elements has one terminal which is exposed above the semiconductor surface. A flexible film having a conductive coating is positioned over the exposed terminals, to selectively operate the switching elements, thereby providing a surface pressure distribution detecting element. Bipolar transistors or MOS field effect transistors are used as the semiconductor switching elements.

When a fingerprint ridge applies a surface pressure from above, to the flexible film, the depressed portion of the film is flexed and brought into contact with one terminal of the semiconductor switching element which is located below the depressed portion so that the switching element is switched ON. Therefore, the surface pressure distribution applied by ridges of a fingerprint can be detected digitally by detecting the ON/-

OFF states of a plurality of semiconductor switching elements arranged in a matrix.

BRIEF DESCRIPTION OF THE DRAWINGS

The invention will next be described in detail with reference to the accompanying drawings, in which.

Figure 1:
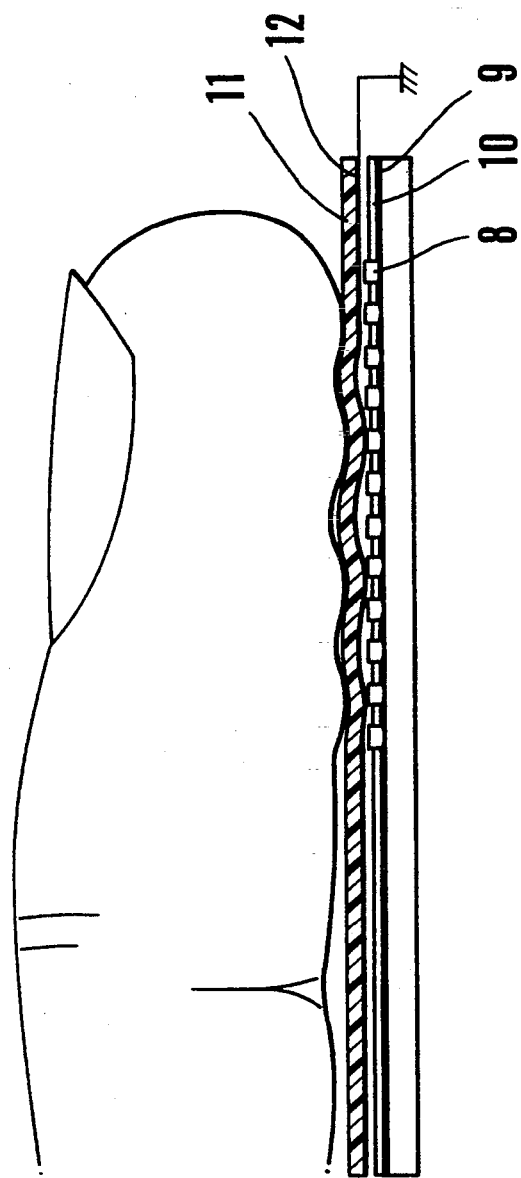
FIG. 1 is a partially cross-sectional view of a semiconductor fingerprint sensor having a surface pressure distribution detecting element.

In the following specification, the components identified by the reference numerals are, as follows:

| Ref. No. | Part |
|---|---|
| 1: | p-type silicon substrate |
| 2: | n+-type buried layer |
| 3: | n-type epitaxial layer |
| 4: | p-type isolation layer |
| 5: | p-type base layer |
| 6: | n-type emitter layer |
| 7: | base electrode |
| 8: | emitter electrode (contact terminal) |
| 9: | silicon oxide film |
| 10: | insulating protective film |
| 11: | film |
| 12: | conductive coating |
| 13: | n-type silicon substrate |
| 14: | p-type well layer |
| 15: | n-type drain layer |
| 16: | n-type source layer |
| 17: | polysilicon gate |
| 18: | gate oxide film |
| 19: | drain electrode |
| 20: | source electrode |
| 21: | insulating interlayer |

FIG. 1 is a partial cross-sectional view of an inventive fingerprint pattern detection semiconductor sensor having a surface pressure distribution detecting element. A semiconductor manufacturing process forms this fingerprint sensor on a semiconductor substrate 1. Placed over the detection unit is a flexible film 11 made of a polyester or polyamide film having a thickness of about 10 μm. A conductive coating 12 is deposited, or otherwise formed, on the undersurface of the film 11. FIG. 1 shows only the emitter electrodes 8, a silicon oxide film 9, and an insulating protective film 10, which taken together, constitute the detection unit.

When the tip of a finger F lightly depresses the film 11, the grounded conductive coating 12 on the undersurface of the film 11 is brought into contact with the emitter electrodes 8 of an array of transistors, according to the pattern of fingerprint ridges. Located below the depressed portion of film 11, in contact with the tops (ridges) of the skin surface, the emitter electrodes 8 are grounded through the conductive coating 12 according to the fingerprint pattern.

Figure 2:
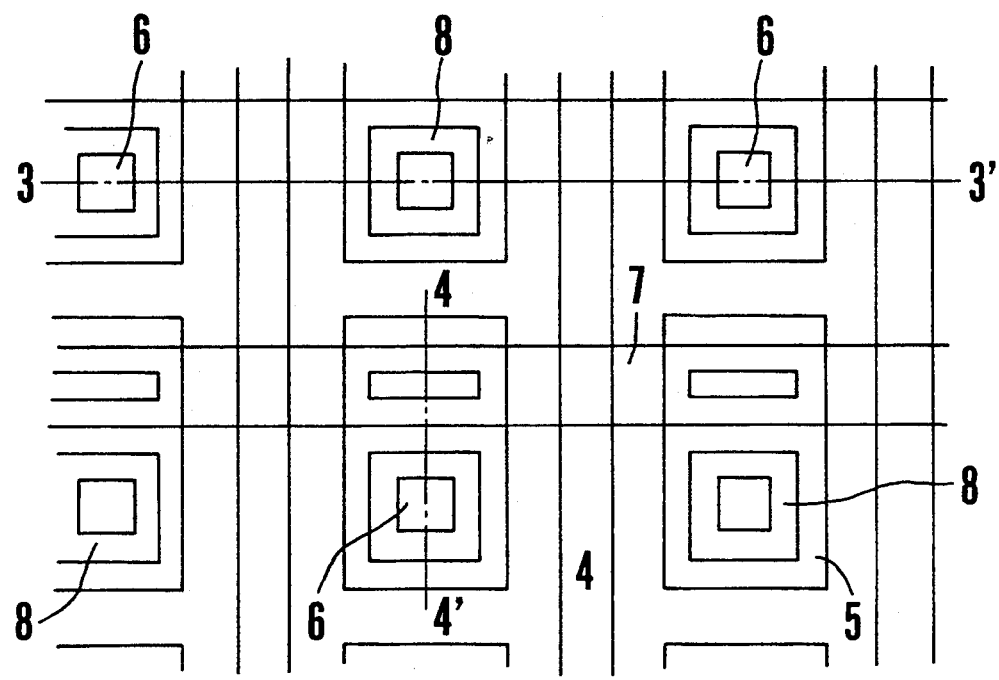
FIG. 2 is a plan view of an integrated circuit semiconductor chip forming a detection unit of a surface pressure distribution detecting element.
Figure 3:
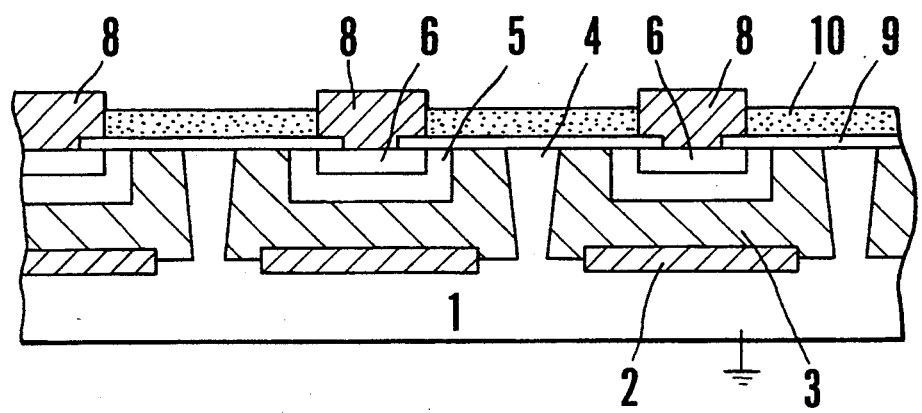
FIG. 3 is a cross-sectional view taken along a line 3-3' in FIG. 2, showing part of a row of electronic switches in the detection unit.
Figure 4:
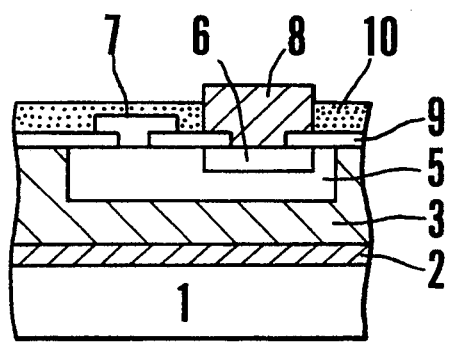
FIG. 4 is a cross-sectional view taken along a line 4-4' in FIG. 2, showing a single detection unit.

The structure of the detection unit shown in FIGS. 2 to 4 uses bipolar transistors as the semiconductor switching elements. In greater detail, when the semiconductor fingerprint sensor chip is manufactured, an n+-type buried layer 2 (FIG. 3) is partially formed on the p-type semiconductor substrate 1. An n-type epitaxial layer 3 is subsequently grown on the resultant structure. A p-type isolation layer 4, a p-type base layer 5, and an n-type emitter layer 6 are formed on the resultant structure. Thereafter, a silicon oxide film 9 is formed. The parts of the silicon oxide film 9 which are on the p-type base layer 5 and the n-type emitter layer 6 are removed.

Subsequently, base electrodes 7 and emitter electrodes 8 are formed. The insulating protective film 10 completely covers all of the resultant structure except for the emitter electrodes 8. Emitter electrodes 8 are part of a matrix of contact terminals arranged in rows and columns. These electrodes will be grounded according to the pattern of fingerprint ridges. Preferably, the emitter electrode 8 is made of gold ("Au").

Figure 5:
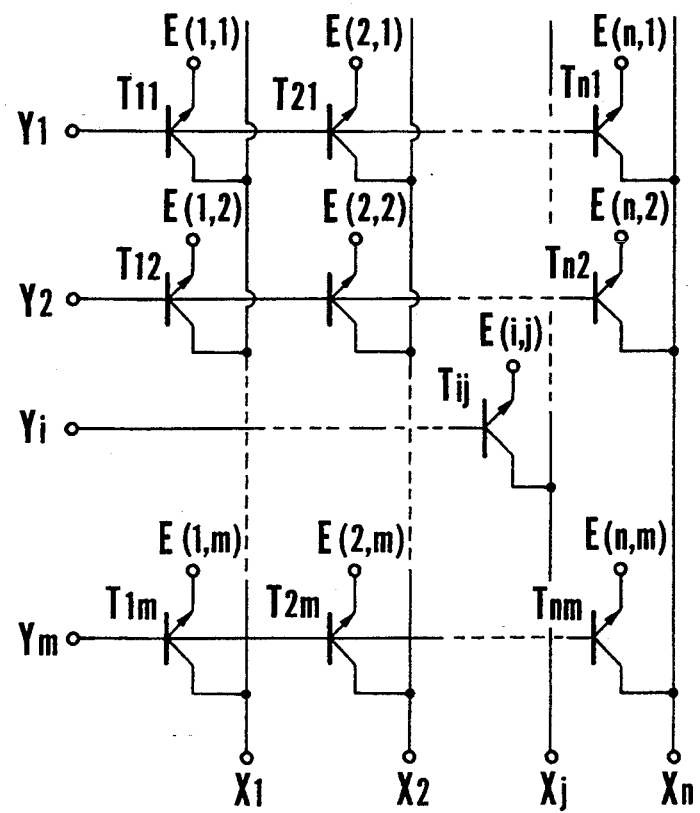
FIG. 5 shows an equivalent electrical circuit of the surface pressure distribution matrix of detecting elements.

The operation of the inventive fingerprint sensor is described next, with reference to the equivalent circuit shown in FIG. 5. More particularly, the detection unit of the fingerprint sensor is a matrix comprising rows of n transistors extending in a horizontal direction and columns of m transistors extending in a vertical direction. The base electrodes of the n transistors (e.g., transistors $T_{11}, T_{21}, \ldots, T_{n1}$), arranged in the row or horizontal direction, are commonly connected to each other. The respective common base terminals are identified as $Y_1, Y_2, \ldots, Y_m$. The collector electrodes of the m transistors (e.g., $T_{11}, T_{12}, \ldots, T_{1m}$), are arranged in columns extending in the vertical direction. The collectors in any column are commonly connected to each other, the respective common collector terminals being identified as $X_1, X_2, \ldots, X_n$.

Assume that the common base terminal $Y_1$ of a row of transistors extending in the horizontal direction is set at a given potential, and further that a collector voltage is sequentially applied to scan the individual common collector terminals, from $X_1$ to $X_n$. Each common collector terminal relates to an individual column of transistors, extending in the vertical direction. If the film 11 of the fingerprint sensor is depressed by a ridge of a fingerprint to cause the corresponding emitter electrode 8 to come into contact with the grounded conductive coating 12 on the undersurface of the film 11, the corresponding emitter contact terminal (e.g., a terminal $E_{(i,j)}$), is at the ground potential. The corresponding transistor $T_{ij}$ is turned on, and a collector current flows therein. By monitoring this collector current, the transistor which has an emitter terminal in contact with film 11 can be identified.

When a common base terminal $Y_{j+1}$ is set at a given potential, and a collector voltage is sequentially applied to scan the common collector terminals from $X_1$ to $X_n$, the ON/OFF states of all transistors $T_{1,j+1}$, $T_{2,j+1}$, ..., $T_{n,j+1}$ of the horizontal row or array $Y_{j+1}$ can be detected. By repeating the same procedure in order to scan the individual rows up to horizontal $Y_m$, the ON/OFF states of all the transistors can be found.

In addition, it is possible to determine whether a contact area is large or small on a basis of the magnitude of a detected collector current. When a pressure acting on each terminal is increased, the contact area is increased accordingly. Since the contact area is increased, the contact resistance is decreased to increase the collector current. That is, a fine resolution of the pressure detection can be performed. Therefore, even a very small fingerprint pattern can be read.

Figure 6:
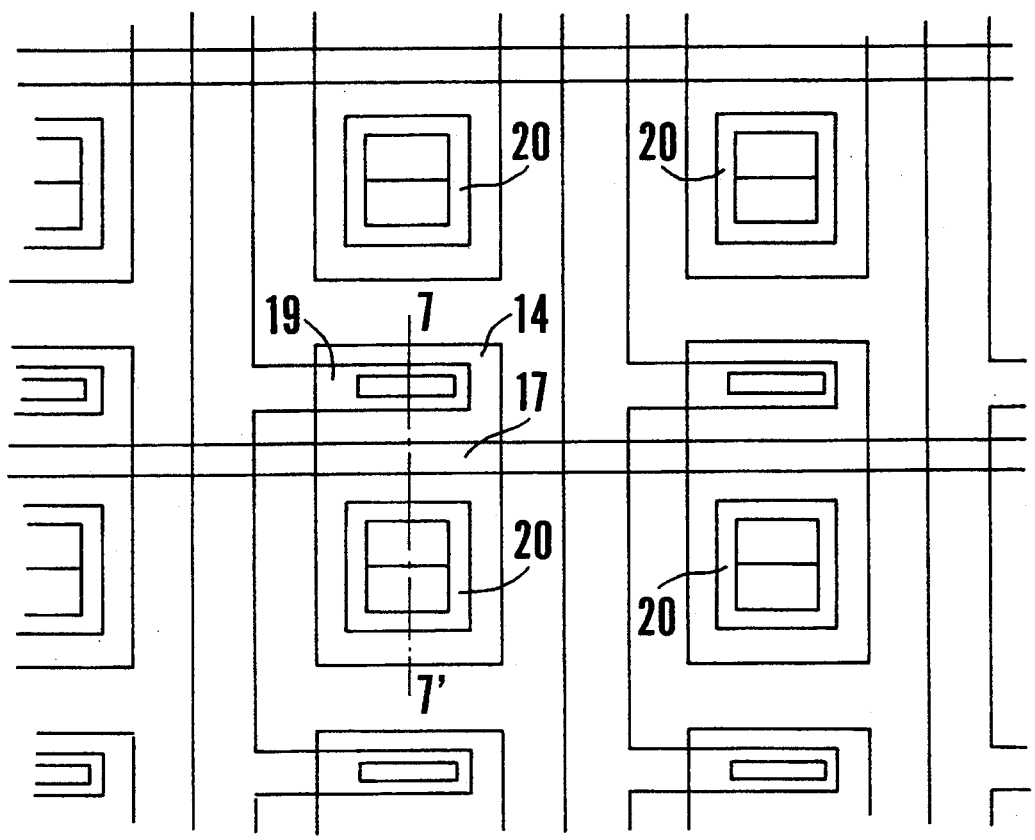
FIG. 6 is a plan view of another embodiment of the present invention showing part of an integrated circuit semiconductor chip forming a detection unit of a surface pressure distribution detecting element.
Figure 7:
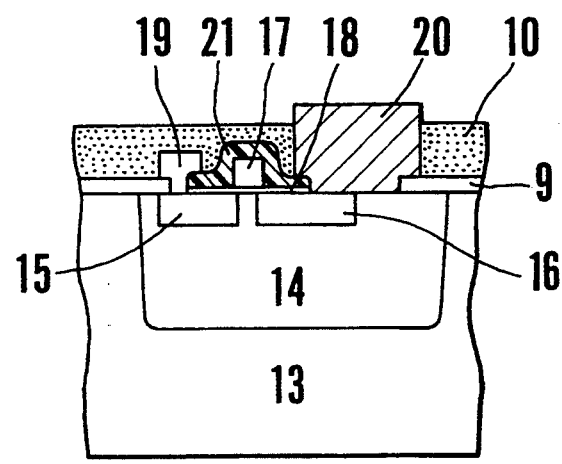
FIG. 7 is a cross-sectional view taken along a line 7-7' in FIG. 6, showing a detection unit.

FIGS. 6 and 7 are partial cross-sectional views showing another embodiment of the invention for detecting the surface pressure distribution, by using MOS field effect transistors as the semiconductor switching elements. In this embodiment, an n-type silicon substrate is used to form a MOS field effect transistor.

In greater detail, this embodiment is manufactured by using the same method that is used for manufacturing a normal MOS field effect transistor. For example, a p-type well layer 14 is formed in an n-type silicon substrate 13. Thereafter, a gate oxide film 18 and a gate polysilicon film 17 are formed sequentially. Phosphorus ions are implanted into the resultant structure by using the gate polysilicon film 17 as a mask so as to simultaneously form drain and source layers 15 and 16. After an insulating interlayer 21, such as a PSG layer, is formed to cover the gate polysilicon film 17. A contact window for a drain electrode is formed in the insulating interlayer 21. Then, a drain electrode wiring layer 19 is formed.

Subsequently, the surface of the resultant structure is covered with an insulating protective film 10 made of polyamide, or the like. A contact window is formed in film 10 for providing a source electrode 20 which serves as a contact terminal. Electrode 20 is made of a material having resistance to corrosion (e.g., Au), thus forming a detecting element.

Figure 8:
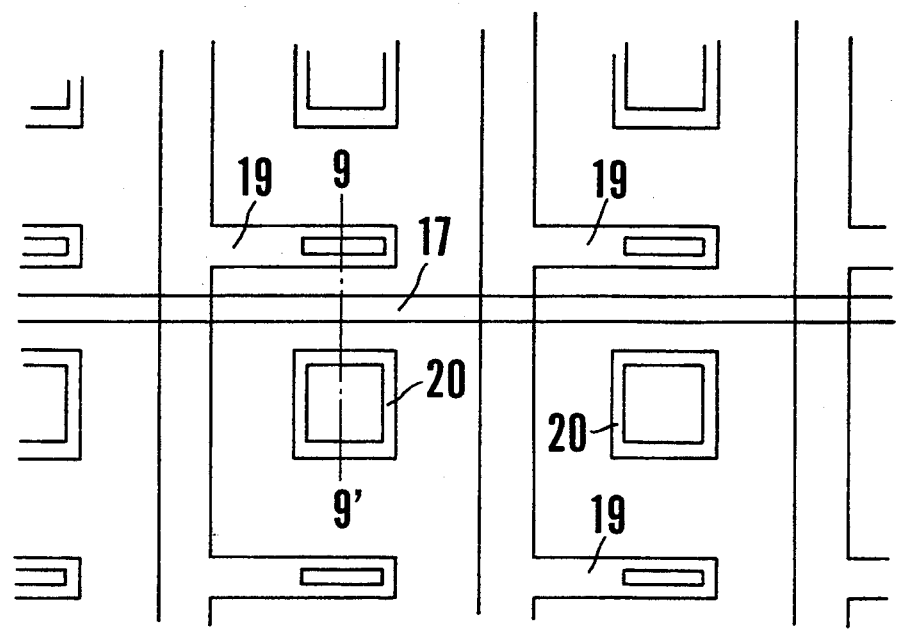
FIG. 8 is a plan view of a detection unit of a surface pressure distribution detecting element according to still another embodiment of the invention.
Figure 9:
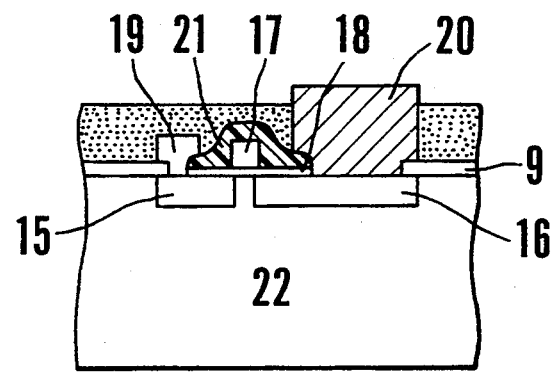
FIG. 9 is a cross-sectional view taken along a line 9-9' in FIG. 8, showing the detection unit.

As shown in FIG. 9, a p-type silicon substrate 1 may be used to form MOS field effect transistors. In this embodiment, a detecting element is also manufactured by using the same method that is used for manufacturing a normal MOS field effect transistor. Hence, a description of the manufacturing methods will be omitted. Note that FIG. 8 is a plan view of the detection unit shown in FIG. 9.

The difference between the embodiments shown in FIGS. 6 and 7 and FIGS. 8 and 9, respectively, is that FIGS. 6 and 7 require a silicon substrate which is positive (+) with respect to the source potential, while FIGS. 8 and 9 require a negative (grounded) substrate. The operations of these elements can be understood by substituting MOS field effect transistors for the transistors in the first embodiment. That is, a gate, a drain, and a source, may be substituted for the base, collector, and emitter, respectively, of each transistor in order to form a matrix from rows and columns of transistors.

In comparison with the transistor embodiment of FIGS. 2–5, the MOS field effect transistor embodiment is characterized as follows. Since no epitaxial and buried layers are required for the MOS field effect transistor embodiment, the detecting elements can be manufactured by a simple and low cost method. In addition, unlike a bipolar transistor, a MOS field effect transistor consumes no base current (requires only a gate voltage), thus reducing power consumption.

Although the above description has been made with reference to npn transistors or n-channel MOS field effect transistors, it is apparent that pnp transistors or p-channel MOS field effect transistors can also be used.

The distance between the ridges of a fingertip skin surface is about 200 to 300 μm. In both the first (transistor) and second (MOS field effect transistor) embodiments, the contact terminals may be arranged at a pitch in the range of 20 to 100 μm in order to more accurately detect the fingerprint pattern.

Figure 10:
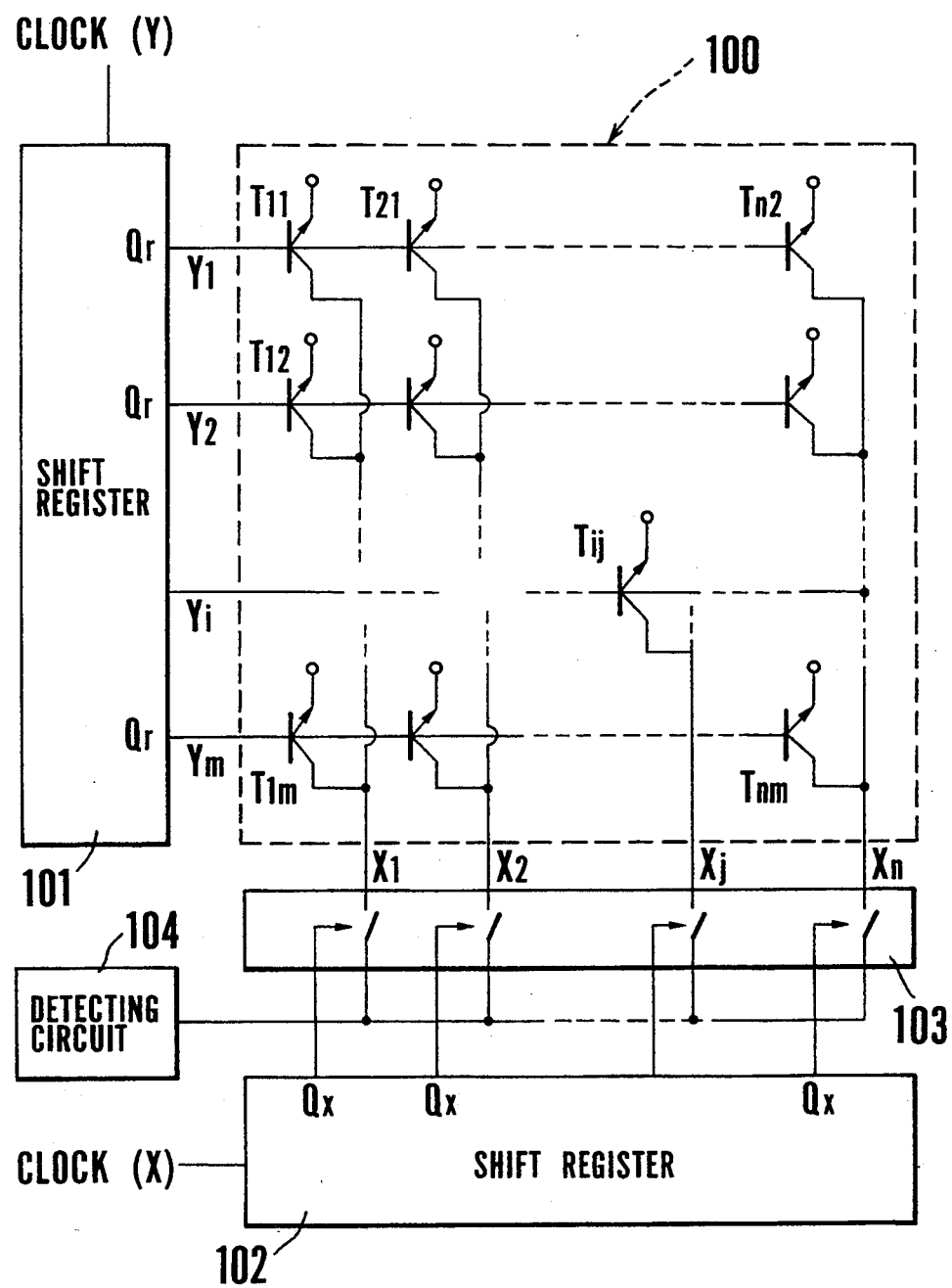
FIG. 10 is a block diagram showing a surface pressure distribution matrix of detecting element and its driving circuit.

FIG. 10 is a block diagram showing a driving circuit for reading the inventive surface pressure distribution on the matrix detecting elements.

The inventive fingerprint sensor (FIG. 10) has a surface pressure distribution detecting matrix 100 comprising rows of m common base terminals $Y_1, Y_2, \ldots, Y_m$ and columns of n common collector terminals $X_1, X_2, \ldots, X_n$. Shift registers 101 and 102, switching circuit 103, detecting circuit 104, and matrix 100 are integrally formed on the same semiconductor chip. The shift register 101 sequentially applies scanning signals to the common base terminals $Y_1$-$Y_m$. The shift register 102 generates scanning signals which are applied to the common collector terminals $X_1, X_2, \ldots, X_n$. The switching circuit 103 sequentially switches the signals from the shift register 102 and applies them to the common collector terminals $X_1, X_2, \ldots, X_n$ of the matrix. The detecting circuit 104 detects the ON/OFF state of the switching circuit 103.

The shift registers 101 and 102, the switching circuit 103, and the detecting circuit 104 constitute the driving circuit. All are known; therefore, a more detailed description of these circuits will be omitted.

As described above, the surface pressure distribution detecting elements and their driving circuit are formed on the same semiconductor chip. A large number of extraction electrodes need not be formed in the X and Y directions. Only a minimum number of terminals are required, as compared with a device wherein a detecting element is used as a single unit. Therefore, the electrodes can be easily formed, and a reduction in size of the element can be realized.

In operation, when surface pressure is applied to the flexible film 11 (FIG. 1), the depressed portion of the film is flexed. The emitter electrodes, or contact electrodes, of the transistors located at the depressed portions of the film are brought into contact with the conductive coating 12 on the flexible film. With this arrangement, there is no need to position scanning electrodes which cross each other, which would complicate the manufacturing process. In addition, the transistors are manufactured by the use of semiconductor manufacturing techniques which have already achieved a high technical perfection and precision, at a relatively low cost. The manufactured detecting elements are almost completely free from variations in sensitivity. Furthermore, since the film stacked on the surface of the surface pressure distribution matrix of detecting elements has only a conductive coating formed on the entire lower surface, the adhesion between the scanning electrodes and the film surface poses no problem. Therefore, no problem is posed in selecting a material for the film.

The conventional elements serves as a passive element of a simple matrix which detects the magnitude of a pressure caused change in contact resistance. However, the invention uses an active matrix of active elements to detect the magnitude of pressure at a collector or drain. Therefore, a high S/N ratio can be obtained because of an amplifying operation.

When an apparatus, such as a fingerprint detecting apparatus, is formed by using the surface pressure distribution matrix of detecting elements, both the matrix and a driving circuit for the element can be formed at the same time and on the same chip. Therefore, no wiring is required between the elements and the driving circuit. All of this leads to a small, compact apparatus.

In the above-described embodiments, when the flexible film receives a surface pressure, the conductive coating is brought into contact with the output electrode of a corresponding transistor, which is turned on. It is important that when the flexible film receives a surface pressure, the degree of contact of the conductive coating with the output electrode of a corresponding transistor is measured as a digital or analog value on the basis of an operating current flowing in the transistor.

Those who are skilled in the art will readily perceive how to modify the invention. Therefore, the appended claims are to be construed to cover all equivalent structures which fall within the true scope and spirit of the invention.

What is claimed is:

1. An integrated circuit semiconductor device having a matrix sensor for a detecting surface pressure distribution, said device comprising a plurality of transistor crosspoints arranged in a matrix form on a p-type semiconductor substrate, each of said transistor crosspoints comprising an n+-type buried layer in the p-type semiconductor substrate, an n-type epitaxial layer over said n+-type buried layer, a p-type isolation layer of said substrate separating said crosspoints, a p-type base layer and an n-type emitter layer over said n-type epitaxial layer, a silicon oxide film over an upper surface of said substrate and said layers in said substrate, the parts of the silicon oxide film which are over the p-type base layer and the n-type emitter layer, base electrodes and emitter electrodes being in contact with said base and emitter layers respectively, and a protective insulating film completely covering all of the structure except for a window exposing the emitter electrodes, said exposed emitter electrodes being contact terminals arranged in rows and columns exposed on a surface of said substrate, and being arranged in a matrix form to receive in varying degree a pattern of small surface pressure, a second electrode on each of said transistors, said second electrodes being commonly connected to form a plurality of columns with electrical isolation between said columns, a third electrode on each of said transistors, said third electrodes being commonly connected to form a plurality of rows intersecting said columns with electrical isolation between said rows, said pattern of surface pressure touching at least one of said first electrodes in order to cause a transistor at the pressure location to be turned on via its first electrode.

2. The matrix element of claim 1 and means for indicating a degree of contact pressure between the deflected portion of said film and said first electrode.

3. The matrix element of claim 2 wherein a degree of of said surface pressure touching said exposed electrode is indicated in response to a degree of current appearing at said second electrode in said transistor, thereby detecting and indicating a degree of surface pressure distribution on said touched first electrode as an analog value.

4. An integrated circuit semiconductor device comprising a surface pressure distribution matrix of detecting elements, said device comprising a plurality of transistors arranged in a matrix form on a p-type semiconductor substrate, said integrated circuit comprising an n+-type buried layer in the p-type semiconductor substrate, an n-type epitaxial layer over said n+-type buried layer, a p-type isolation layer of said substrate separating crosspoints, a p-type base layer and an n-type emitter layer over said n-type epitaxial layer, a silicon oxide film over an upper surface of said substrate and said layers in said substrate, the parts of the silicon oxide film which are over the p-type base layer and the n-type emitter layer, base electrodes and emitter electrodes being in contact with said base and emitter layers respectively, and a protective insulating film completely covering all of the structure except for exposing the emitter electrodes, said emitter electrodes being contact terminals arranged in rows and columns and being exposed above said substrate in said matrix form, second electrodes on each of said transistors arranged in rows on said semiconductor substrate, each of the second electrodes in a row being commonly connected to each other, each of said rows being electrically isolated from other of said rows of electrodes, a third electrode on each of said transistors, said third electrodes being arranged in columns perpendicular to said rows, the third electrodes in each column being commonly connected to each other, each of said columns being electrically isolated from other of said columns, each emitter electrode which receives a surface pressure causing a transistor to be turned on at the location where pressure is applied to one of said emitter electrodes whereby a pattern of turned on transistors corresponds to a pattern of applied pressure.

5. The matrix of claim 4 and detector means for responding to a degree of the areas of contacts where pressures are applied to any ones of said exposed emitter electrodes.

6. The matrix of claim 5 wherein said means for measuring said degree of area contact is responsive to current flowing in said second electrode.

7. A matrix type according to either claim 1 or claim 4, wherein said exposed electrodes are arranged in rows and columns at a pitch of 10 to 100 $\mu$m.

8. A matrix type according to either claim 1 or claim 4 and first and second shift registers coupled to sequentially apply scanning signals to said common row and common column electrodes, respectively, and a detecting circuit for detecting an ON/OFF state of each of said transistors in said matrix.

9. An integrated circuit semiconductor surface pressure distribution matrix detector comprising a plurality of transistors arranged in a matrix form on a p-type semiconductor substrate, an n+-type buried layer in the p-type semiconductor substrate, an n-type epitaxial layer over said n+-type buried layer, a p-type isolation layer of said substrate separating said crosspoints, a p-type base layer and an n-type emitter layer over said n-type epitaxial layer, a silicon oxide film over an upper surface of said substrate and said layers in said substrate, the parts of the silicon oxide film which are over the p-type base layer and the n-type emitter layer, base electrodes and emitter electrodes being in contact with said base and emitter layers respectively, and a protective insulating film completely covering all of the structure except for a window exposing the emitter electrodes, said emitter electrodes being contact terminals arranged in rows and columns, and being arranged in said matrix form,
  a collector electrode on each of said transistors, said transistors being arranged in rows and columns on said semiconductor substrate with said collector electrodes being commonly connected in columns and with electrical isolation between said columns,
  a base electrode on each of said transistors, said base electrodes being commonly connected in rows with electrical isolation between said rows,
  a surface pressure upon at least some area on at least one of said emitter electrodes causing a transistor at the pressure location to be turned on via its emitter electrode.

10. An integrated circuit semiconductor device for detecting a surface pressure distribution matrix detector comprising a plurality of field effect transistors formed in a matrix on an n-type semiconductor substrate, a p-type well layer in said n-type silicon substrate, a gate oxide film formed in and a gate polysilicon film formed on said well layer, phosphorus ions implanted into a resultant structure by using the gate polysilicon film as a mask to provide drain and source layers in said well layer, an insulating interlayer covering the gate polysilicon film, a drain electrode contact window in the insulating interlayer, a drain electrode wiring layer commonly interconnecting drains to define columns of drains in said matrix crosspoints,
  an insulating protective film of polyamide over said substrate and structures formed thereon, a contact window in said insulating protective film over each source electrode of transistors in said matrix, said source electrodes being contact terminals having resistance to corrosion,
  one of said source and drain electrodes on each of said transistors being exposed above said substrate and providing a pressure detecting element, said one of said source and drain electrodes being arranged in said matrix form,
  one of said source and drain electrodes being an electrode to be touched by an applied pressure,
  the other of said source and drain electrodes on each of said transistors being arranged in rows on said semiconductor substrate, each of said other of said source and drain electrodes in a row being commonly connected to each of the other of said source and drain electrodes in that row, each of said rows being electrically isolated from other of said rows of electrodes,
  said gate polysilicon film forming gate electrodes on each of said transistors arranged in said columns perpendicular to said rows,
  each of said columns being electrically isolated from other of said columns,
  a surface pressure making contact with at least one of said one of the source and drain electrodes in order to cause at least one transistor to be turned on at the location where said one of the source and drain electrode is touched by said flexible film.

11. An integrated circuit semiconductor surface pressure distribution matrix detector comprising a plurality of field effect transistors formed in a matrix on an n-type semiconductor substrate, a p-type well layer in said n-type silicon substrate, a gate oxide film formed in and a gate polysilicon film formed on said well layer, phosphorus ions implanted into a resultant structure by using the gate polysilicon film as a mask to provide drain and source layers in said well layer, an insulating interlayer covering the gate polysilicon film, a drain electrode contact window in the insulating interlayer, a drain electrode wiring layer commonly interconnecting drains to define rows of drains in said matrix crosspoints,
  an insulating protective film over said substrate and structures formed thereon, a contact window in said insulating protective film over each source electrode of transistors in said matrix, said source electrodes being contact terminals having resistance to corrosion, a source electrode on each of said transistors being exposed above said substrate and providing a pressure detecting element, said source electrodes being arranged in said matrix form,
  said drain electrodes on said transistors being arranged in said rows on said semiconductor substrate with each of said rows being electrically isolated from other of said rows of electrodes,
  said gate electrodes being arranged in columns perpendicular to said rows, each of said columns being electrically isolated from other of said columns,
  a surface pressure making some degree of contact with at least one of said source electrodes, said degree of contact corresponding to a degree of applied pressure in order to cause at least one transistor to be turned on at the location where said source electrode is touched.

* * * * *